US010992432B2

(12) United States Patent
Makki et al.

(10) Patent No.: US 10,992,432 B2
(45) Date of Patent: Apr. 27, 2021

(54) ADAPTIVE RECEIVER IN A NON-ORTHOGONAL MULTIPLE ACCESS (NOMA) COMMUNICATION SYSTEMS (71) Applicant: Telefonaktiebolaget LM Ericsson (publ), Stockholm (SE)

(72) Inventors: Behrooz Makki, Gothenburg (SE); Ali Behravan, Stockholm (SE); Mona Hashemi, Gothenburg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 507 days.

(21) Appl. No.: 16/066,195

(22) PCT Filed: Apr. 6, 2018

(86) PCT No.: PCT/EP2018/058878
§ 371 (c)(1),
(2) Date: Jun. 26, 2018

(87) PCT Pub. No.: WO2019/192723
PCT Pub. Date: Oct. 10, 2019

(65) Prior Publication Data
US 2021/0075568 A1 Mar. 11, 2021

(51) Int. Cl.
*H04J 11/00* (2006.01)
*H04L 5/00* (2006.01)
*H04W 28/04* (2009.01)

(52) U.S. Cl.
CPC .......... *H04L 5/0037* (2013.01); *H04J 11/004* (2013.01); *H04W 28/04* (2013.01)

(58) Field of Classification Search
CPC ... H04L 5/0055; H04L 5/0053; H04L 1/1671; H04L 1/00; H04L 1/1896; H04L 5/0035; H04L 1/18; H04L 1/1822; H04L 1/1864; H04L 41/0654; H04L 1/0073; H04L 27/2601; H04L 1/007; H04L 1/1819; H04L 1/1825; H04L 2001/125; H04L 1/0025; H04L 1/08; H04L 1/1835; H04L 1/1845; H04L 1/189; H04L 25/03254; H04L 27/2602; H04L 5/0062; H04L 5/0037; H04W 28/04; H04W 24/02; H04W 28/0236; H04W 28/065; H04W 28/14; H04J 11/004
See application file for complete search history.

(56) References Cited

U.S. PATENT DOCUMENTS

2016/0191174 A1 6/2016 Hwang et al.
2016/0269933 A1* 9/2016 Li .................... H04W 28/065
(Continued)

OTHER PUBLICATIONS

Xu et al., "NOMA: An Information Theoretic Perspective", Fellow, IEEE, arXiv:1504.07751v2 [cs.IT] (May 12, 2015). (6 pages).
(Continued)

*Primary Examiner* — Daniel Lai
(74) *Attorney, Agent, or Firm* — Sage Patent Group (57) ABSTRACT An adaptive receiver for UEs using NOMA-based schemes. One objective is to improve the achievable rate of the weak UE and improve the fairness among the grouped UEs. At the same time, an embodiment gives the chance to reduce the error probability of the strong UE. Thus, compared to conventional NOMA, an embodiment increases the network sum throughput.

16 Claims, 11 Drawing Sheets (56) References Cited

U.S. PATENT DOCUMENTS

| | | | |
|---|---|---|---|
| 2017/0094668 A1 | 3/2017 | Tsai et al. | |
| 2017/0164346 A1* | 6/2017 | Ohwatari | H04W 72/04 |
| 2017/0331573 A1* | 11/2017 | Li | H04W 72/1289 |
| 2017/0338915 A1 | 11/2017 | Kim et al. | |
| 2017/0346598 A1* | 11/2017 | Robert Safavi | H04J 11/0043 |

OTHER PUBLICATIONS

MCC Support, "Final Report of 3GPP TSG RAN WG1 #85 v1.0.0 (Nanjing, China, May 23-27, 2016)" 3GPP TSG RAN WG1 Meeting #86, Göteborg, Sweden, (Aug. 22-26, 2016), R1-166056. (170 pages).

3GPP, "3rd Generation Partnership Project; Technical Specification Group Radio Access Network; Study on Network-Assisted Interference Cancellation and Suppression (NAIC) for LTE (Release 12)", 3GPP TR 36.866 V12.0.1 (Mar. 2014). (64 pages).

MediaTek Inc., "Study on Downlink Multiuser Superposition Transmissions for LTE", Document for Approval, 3GPP TSG RAN Meeting #67, Shanghai, China, Mar. 9-12, 2015), RP-150496. (7 pages).

International Search Report and Written Opinion dated Oct. 19, 2018 issued in International Application No. PCT/EP2018/058878. (15 pages).

First Examination Report dated Jul. 15, 2020 for IN Patent Application No. 201847024211, 9 pages.

* cited by examiner

ADAPTIVE RECEIVER IN A NON-ORTHOGONAL MULTIPLE ACCESS (NOMA) COMMUNICATION SYSTEMS

CROSS REFERENCE TO RELATED APPLICATION(S)

This application is a 35 U.S.C. § 371 National Stage of International Patent Application No. PCT/EP2018/058878, filed Apr. 6, 2018, designating the United States.

TECHNICAL FIELD

Disclosed are embodiments related to non-orthogonal multiple access (NOMA) communication systems.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

NOMA exploits channel difference between or among UEs to improve spectrum efficiency. Generally, the highest gain of NOMA is observed in the cases where a "strong" UE (i.e., a UE experiencing a good channel condition with a base station, such as, for example, a UE located in the center of a cell) and a "weak" UE (i.e., a UE having a poor channel condition with the base station, such as, for example, a UE located at or near a cell edge) are grouped (i.e., use the same radio resources). However, the implementation of NOMA implies: 1) use of more advanced and complex receivers to enable multiuser signal separation, 2) more difficult synchronization, and 3) a higher signal decoding delay For example, considering downlink NOMA, the strong UE typically uses successive interference cancellation (SIC) to first decode and remove the signal of the weak UE and then decode its own signal interference-free. As a result, compared to conventional OMA scheme, NOMA-based data transmission leads to higher receiver complexity. Also, compared to OMA-based systems, the two-step decoding process of the strong UE may lead to larger end-to-end transmission delay for the strong UE, as well as for the weak UE (e.g. in scenarios in which their signals should be synchronized). Also, there is a probability that the strong UE cannot correctly decode the message of the weak UE affecting the successful decoding probability of its own message.

Also, while using NOMA outperforms OMA in terms of sum rate, the sum rate gain of NOMA is at the cost possible rate loss for the weak UE (e.g., the cell-edge UE). This is because, with downlink NOMA, the weak UE considers the signal of the strong UE as interference and uses the typical OMA-based decoder to decode its own message. Thus, depending on the interference power, there is a probability that NOMA-based transmission leads to lower achievable rates for the weak UE, compared to the cases using OMA. Also, there may be unfair resource allocation between the weak and the strong UEs.

In one embodiment, this disclosure describes an adaptive receiver for the weak UEs using NOMA-based schemes. The objective is to improve the achievable rate of the weak UE and improve the fairness among the grouped UEs. At the same time, the proposed scheme gives the chance to reduce the error probability of the strong UE. Thus, compared to conventional NOMA, the proposed scheme increases the network sum throughput. In the proposed scheme, depending on the message decoding status of the strong UE, different decoding schemes may be considered by the weak UE such that it can remove the interfering signal of the strong UE and, thereby, improve its own achievable rate. Compared to the conventional NOMA techniques, the proposed scheme increases the throughput of the weak UEs and improves the fairness among the grouped UEs. Moreover, the proposed scheme makes it possible to improve the performance of the strong UE and, consequently, increase the network sum throughput.

In another embodiment, this disclosure describes an adaptive receiver for the strong UEs using hybrid automatic repeat request (HARM) in NOMA-based networks. The objective is to reduce the implementation complexity, the decoding delay, and the probability of error propagation for the strong UEs. At the same time, the proposed scheme reduces the end-to-end transmission delay of the weak UEs as well. In the proposed setup, depending on the message decoding status of the weak UE, different decoding schemes may be considered by the strong UE. Then, depending on the selected decoding scheme, the network node (NN) can synchronize the signals of the UEs correspondingly. Compared to the conventional NOMA techniques, the proposed scheme reduces the receiver complexity of the strong UE considerably. Also, the proposed scheme reduces the end-to-end transmission delay of the network as well as the error propagation at the strong UE.

Accordingly, in one aspect there is provided a method performed by a first user equipment, UE (101), that is being served by a network node (105). The method includes the first UE receiving a first superimposed signal, the first superimposed signal comprising a first message for the first UE and a second message for a second UE (102) being served by the network node. In some embodiments, the first UE is experiencing a better channel condition than the second UE. The method also includes the first UE obtaining the first message from the first superimposed signal and obtaining the second message from the first superimposed signal. The method further includes, after receiving the first superimposed signal, the first UE obtaining information that indicates that the second UE was unable to decode the second message from the first superimposed signal. The method also includes, after receiving the first superimposed signal, the first UE receiving a second superimposed signal comprising at least a portion of the second message for the second UE and a third message for the first UE. The method further includes, as a result of receiving the information indicating that the second UE was unable to decode the second message from the first superimposed signal, the first UE uses the obtained second message to remove the at least a portion of the second message from the second superimposed signal, thereby producing a residual signal, and obtains the third message from the residual signal.

In some embodiments, obtaining the information comprises receiving a message transmitted by the network node, wherein the message indicates that the second UE was unable to decode the second message. In other embodiments, obtaining the information comprises receiving a negative acknowledgement transmitted by the second UE.

In some embodiments, the first UE employs successive interference cancellation (SIC) to obtain the first and second messages from the first superimposed signal. In such an embodiment, the first UE may employ a non-SIC decoder to obtain the third message from the residual signal.

In some embodiments, the second superimposed signal comprises the second message, and the first UE uses the obtained second message to remove the second message from the second superimposed signal.

In some embodiments, the first UE takes a first amount of time to obtain the first and second messages from the first superimposed signal, the first UE takes a second amount of time to produce the residual signal and obtain the third message from the residual signal, and the first amount of time is greater than the second amount of time.

BRIEF DESCRIPTION OF THE DRAWINGS

The accompanying drawings, which are incorporated herein and form part of the specification, illustrate various embodiments.

DETAILED DESCRIPTION

Figure 1:
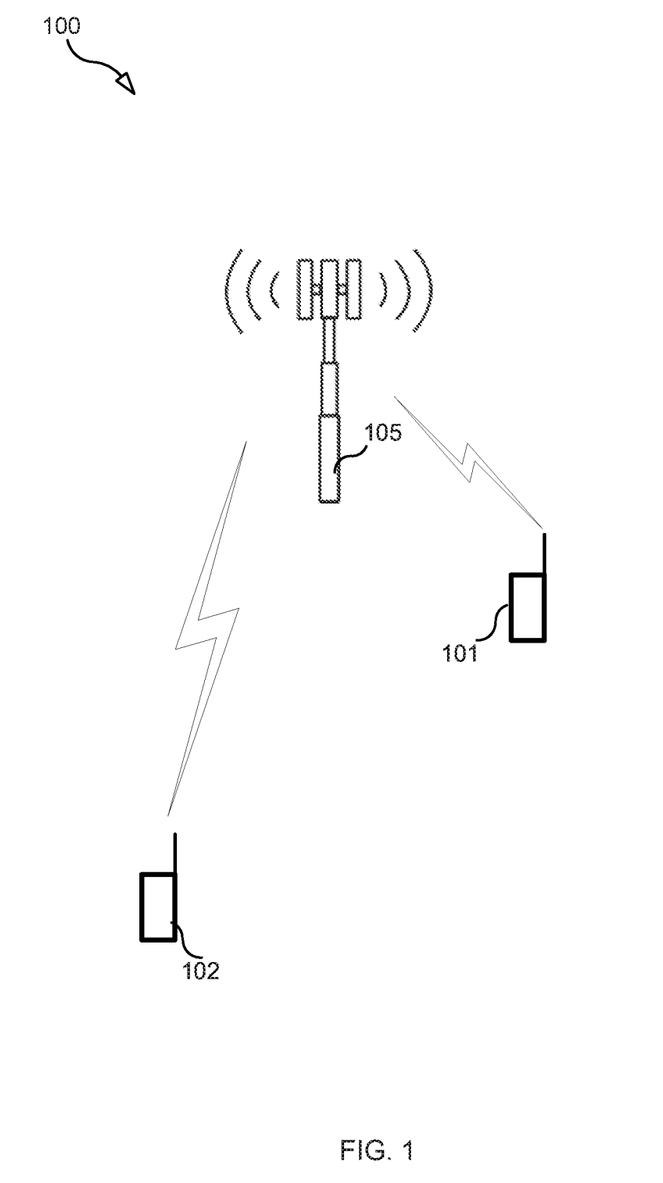
FIG. 1 illustrates a network node communicating simultaneously with a first UE and a second UE.

FIG. 1 illustrates a network 100 having a network node (NN) 105 (e.g., a system comprising a 4G or 5G base station or other access point) serving two UEs: UE 101 and UE 102. The two UEs have different channel (or "link") qualities. In this scenario, UE 102 is a "weak" UE (e.g., a cell-edge UE) and UE 101 is a "strong" UE (e.g. a cell-center UE).

With respect to uplink OMA transmissions, the UE 101's and UE 102's signals are transmitted in orthogonal resources, for instance at the same time but in different frequency bands, and the NN 105 decodes the two transmitted signals separately. With respect to downlink OMA transmissions, the NN 105 transmits for UE 101 a first signal using for example a first frequency band and transmits for UE 102 a second signal using for example a second frequency band that does not overlap with the first frequency band.

With respect to uplink NOMA, on the other hand, the UEs share the same frequency (or "spectrum"), time resources, and code or spreading resources, if any, to send their messages simultaneously. In such a NOMA scenario, the NN, using for example a SIC receiver, first decodes the message of UE 101 (the "strong" UE), considering the signal of UE 102 as noise. Then, after successfully decoding UE 101's signal, the NN subtracts UE 101's signal from the received signal and decodes UE 102's signal with no interference from UE 101.

Likewise, with respect to downlink NOMA, UE 101 and UE 102 are served by the NN in common spectrum resource blocks, i.e., time-frequency chunks. We shall consider a frequency slot so that the time-frequency chunks refer to different time slots. Then, with no loss of generality, suppose that UE 101 experiences a better channel quality compared to UE 102 (i.e., UE 101 is the strong UE and UE 102 is the weak UE). That is, we have $|h_2| \leq |h_1|$, where $h_1$ represents the channel coefficient of the NN-UE 101 link and $h_2$ represents the channel coefficient of the NN-UE 102 link. We define the channel gains as $g_i = |h_i|^2$, $i=1,2$.

Using NOMA, in time slot t the NN generates and transmits a superimposed signal $S(t) = \sqrt{P_1}X_1(t) + \sqrt{P_2}X_2(t)$ to both UEs in the same resources. Here, $X_1(t)$ and $X_2(t)$ are the unit-variance messages for UE 101 and UE 102, respectively, and $P_i$, $i=1, 2$, are their corresponding transmit powers with $P_1 + P_2 = P$ where P is the NN total power. In this way, the signal received by UE 101 (i.e., $Y_1(t)$) and the signal received by UE 102 (i.e., $Y_2(t)$) is given by:

$$Y_i(t) = h_i(\sqrt{P_1}X_1(t) + \sqrt{P_2}X_2(t)) + Z_i(t), \ i=1,2, \quad (1)$$

where $Z_i(t)$ denotes a noise signal (e.g., Gaussian white noise).

Figure 2:
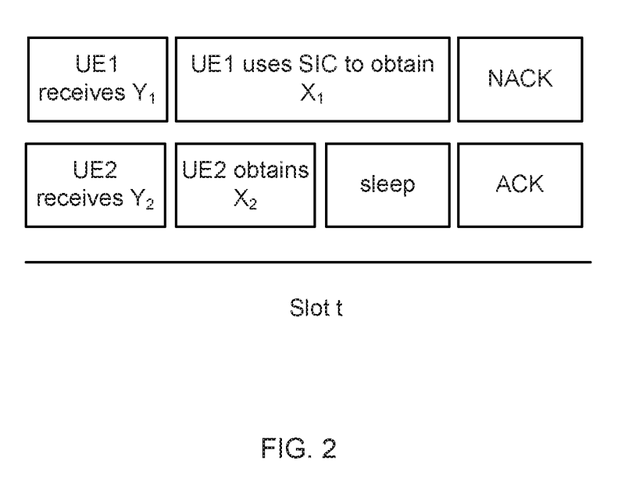
FIG. 2 illustrates processing that occurs during a time slot.

In the above scenario, which is illustrated in FIG. 2, UE 101 uses a SIC receiver to first decode-and-remove the message of UE 102 (i.e., $X_2$) and then obtain its own message ($X_1$) with no interference. The UE with the worse channel quality, i.e., UE 102 uses typical decoders to decode its own message in the presence of interference of the signal for UE 101.

The goal of each UE is to decode its own message, although they may decode the message of the other UE to reduce the interference. With conventional NOMA, UE 102 considers the signal for UE 101 as interference and uses OMA-based receivers to decode its own message. This is because it can be theoretically shown that there is no chance that UE 102 can first decode-and-remove the message of UE 101 (and then, decode its own message interference-free). UE 101, on the other hand, uses a SIC receiver to first decode-and-remove the message of UE 102 and then decode its own message interference-free.

Compared to conventional OMA-based receivers, SIC is a high-complexity scheme. Also, because the desired signal is decoded in two steps, SIC implies larger decoding delay which affects, e.g., the HARQ feedback process and, thereby, may increase the end-to-end transmission delay for both UEs in the situations where UE 102's signal should be synchronized with the signal of the UE 101 (different methods can be applied to synchronize the signals—for instance, some sleeping period may be considered by UE 102 (as illustrated in FIG. 2) or the NN may synchronize the signals of the UEs). Finally, with SIC, there is a probability of error propagation. This is because, if the message of UE 102 is not correctly decoded in the first step, the interference is not removed which reduces the probability that the cell-center can successfully decode its own message.

With this setup, the achievable rate for UE 101 (i.e., $R_1$) and the achievable rate for UE 102 (i.e., $R_2$) is given by:

$$\begin{cases} R_1 = \log_2(1 + P_1 g_1), \\ R_2 = \log_2\left(1 + \dfrac{P_2 g_2}{1 + P_1 g_2}\right). \end{cases} \quad (2)$$

From (2), it can be seen that, depending on the received interference power term $P_1 g_2$, UE 102 may suffer from low transmission rates. Also, note that, with the message of UE 102 added as an interference, UE 101 suffers from error propagation effect. Particularly, there is a probability that UE 101 can not successfully remove the interference signal affecting the probability that it can decode its own message correctly. Thus, there is reasonably high probability that UE 101 can not decode its own message correctly, and it may need retransmissions.

Accordingly, it would be useful to develop a first adaptive decoding scheme where hybrid automatic repeat request (HARQ)-based signals are used to decode the interference seen by UE 102 before UE 102 decodes its message of interest (in this way, removing the interference allows the NN to serve UE 102 with higher rates), and it would also be useful to develop an adaptive decoding scheme where SIC is used only when it is required.

In the following descriptions, UE 101 is referred to as $UE_1$ and UE 102 is referred to as $UE_2$.

A. The Adaptive Decoding Scheme for the Weak UE ($UE_2$)

Figure 3:
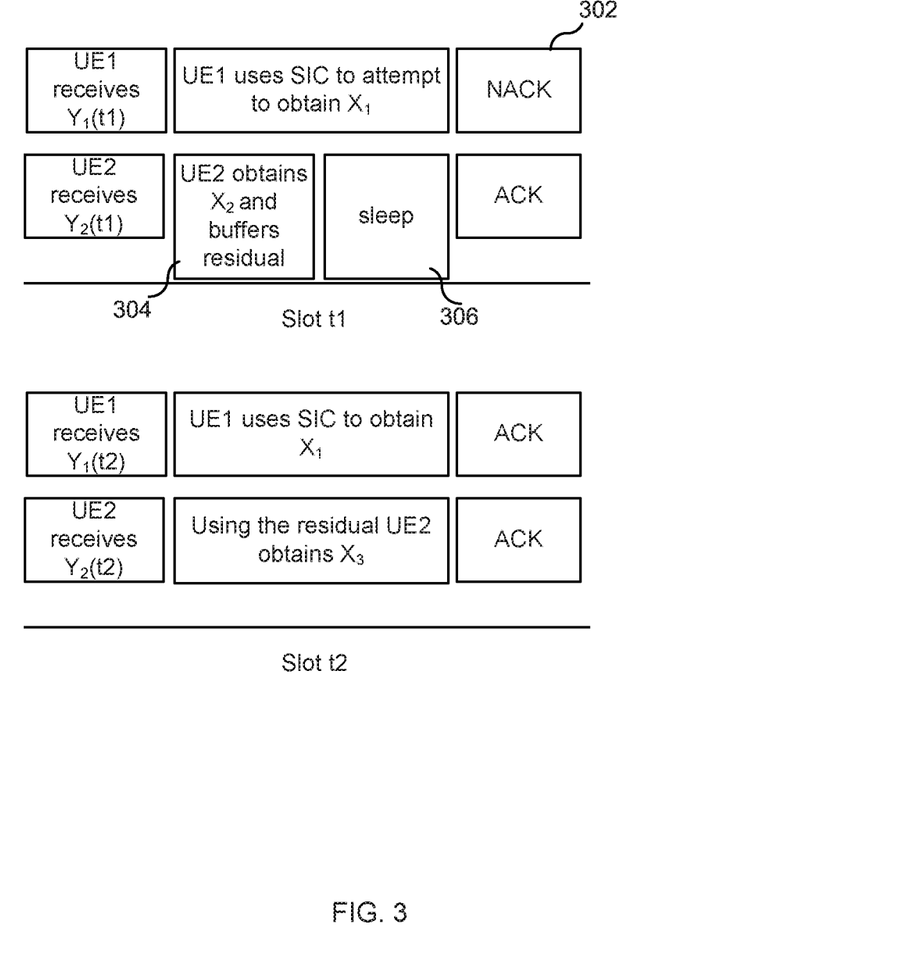
FIG. 3 illustrates processing, according to one embodiment, that occurs during first and second time slots.

Consider two successive time slots t and t̄ (also referred to as t1 and t2), as illustrated in FIG. 3. In the proposed setup, $UE_1$ uses the same SIC-based decoding scheme as in conventional NOMA. However, depending on the $UE_1$'s message decoding status, different decoding schemes may be considered by $UE_2$ in subsequent time slots (e.g. slot t̄). For simplicity of presentation, assume that, in Slot t, $UE_1$ has not decoded its own message $X_1(t)$ correctly, independently of whether or not it can decode $X_2(t)$. Also assume that $UE_2$ has correctly decoded its own message $X_2(t)$ but, of course, it can not decode $X_1(t)$ correctly. However, the method presented below is applicable for other message decoding conditions at $UE_1$ and $UE_2$ as long as $UE_1$ can not decode $X_1(t)$ and needs a retransmission.

In slot t, $UE_2$ first decodes its own message in the presence of interference and then, removes its own message, i.e., $h_2\sqrt{P_2}X_2(t)$ in (1), from the received signal $Y_2(t)$, thereby producing a residual received signal, i.e., $\tilde{Y}_2(t) = h_2\sqrt{P_1}X_1(t) + Z_2(t)$ (note that, given that $UE_1$ has not correctly decoded $X_1(t)$ and with $|h_1| \geq |h_2|$, $UE_2$ has no chance to correctly decode $X_1(t)$ in slot t). $UE_2$ then buffers the residual signal. The residual signal gives $UE_2$ the chance to decode-and-remove the interference of $UE_1$ in the next time slot (i.e., slot t̄).

For instance, in slot t̄ when the NN retransmits message $X_1(t)$ (i.e., the message for $UE_1$ that $UE_1$ was not able to decode in time slot t), $UE_2$ uses the buffer residual signal (i.e., $\tilde{Y}_2(t) = h_2\sqrt{P_1}X_1(t) + Z_2(t)$) and the signal received in time slot t̄ (i.e., $Y_2(t̄) = h_2(\sqrt{P_1}X_1(t̄) + \sqrt{P_2}X_2(t̄)) + Z_2(t̄)$, with $X_1(t) = X_1(t̄)$), to first combine the two copies of the $UE_1$ signal and decode-and-remove it from $Y_2(t̄)$. Then, $UE_2$ decodes $X_2(t̄)$ interference-free. This is because with two copies of the $UE_1$'s message, $UE_2$ has the chance to decode the interference.

In the example, above Chase combining HARQ was used (i.e., $X_1(t) = X_1(t̄)$). In such cases, $UE_2$ can use a maximum ratio combining receiver to decode $X_1(t)$ from combining $Y_2(t)$ and $\tilde{Y}_2(t)$. However, the same setup is applicable for HARQ protocols other than Chase combining HARQ, such as, Incremental Redundancy HARQ, and $UE_2$ need only use the appropriate receiver depending on the selected HARQ protocol. In summary, we can use the standard OMA-based receiver to decode $X_1(t̄)$ and then, based on the SIC receiver concept, remove this signal to have an interference-free signal for $UE_2$.

Because $UE_2$ may experience an interference-free condition in slot t̄, it is possible for the NN to adapt the transmission parameters for that time slot. Particularly, in slot t̄ a higher data rate may be considered for $UE_2$ which leads to better fairness between $UE_1$ and $UE_2$. As an alternative method, the NN may reduce the transmit power for the $UE_2$ message which, with a sum power constraint $P_1 + P_2 = P$, increases the transmit power for $UE_1$ message and, consequently, increases its successful message decoding probability. That is, depending on the network designer's point of interest, our proposed scheme can give the chance to reduce the error probability for $UE_1$.

The above process continues until $UE_1$ correctly decodes its message or the maximum number of retransmission rounds is reached. In any round, if $UE_2$ has correctly decoded the message of $UE_1$ while $UE_1$ has still not decoded its message, the interference signal can be easily removed by $UE_2$ with no decoding process. Thus, $UE_2$ can be provided with high data rates. Also, in any round, if $UE_2$ can not correctly decode the message of $UE_1$, it decodes-and-removes its own message and buffers the residual signal containing the message of $UE_1$ for possible use in the next rounds. The key to enable such adaptive decoding scheme at $UE_2$ is for $UE_2$ to be aware that NN is retransmitting the message for $UE_1$ (e.g., $UE_2$ being aware of the message decoding status of $UE_1$). In some embodiments, the NN provides $UE_2$ with this information. In other embodiments, $UE_2$ monitors the acknowledgements sent by $UE_1$ so that $UE_2$ will know when $UE_1$ has sent a negative acknowledgment (NACK), and, thereby know that the NN will then retransmit the message to $UE_1$.

To summarize, in one embodiment, the following steps may be performed:

Step 1: The NN, using a NOMA transmission scheme, transmits in a first time slot (denoted slot t1 here and denoted t above) a first signal $S_{t1}$, which contains a message for $UE_1$ (denoted $X_1$) and a message for $UE_2$ (denoted $X_2$);

Step 2: $UE_1$ receives signal $Y_1(t1)$ corresponding to $S_{t1}$ (see equation (1)), $UE_2$ receives signal $Y_2(t1)$ corresponding to $S_{t1}$, $UE_1$ attempts to decode $X_1$ from $Y_1(t1)$, and $UE_2$ attempts to decode $X_2$ from $Y_2(t1)$. Assuming $UE_1$ was not able to decode $X_1$, $UE_1$ transmits a NACK (see block 302 in FIG. 3) so that NN will transmit in a following time slot (t2) (also referred to as t̄) a second signal $S_{r2}$ that contains $X_1$ and a message for $UE_2$ (denoted $X_3$, which may be identical to $X_2$ or a new message that is different than $X_2$). Also, as described above, assuming $UE_2$ was able to successfully decode $X_2$, $UE_2$ generates the residual signal, as described above, and buffers the residual signal (see block 304 in FIG. 3). To synchronize the UEs' signals, some delay may be considered by $UE_2$, shown by the "sleep" box 306 in FIG. 3 (alternatively the network may be the synchronization).

Step 3: The NN receives the NACK transmitted by $UE_1$. The NN also receives the acknowledgement sent by $UE_2$, which in this case we can assume is a positive acknowledgement (ACK).

Step 4: The NN informs $UE_2$ that in time slot t2 NN will transmit a signal ($S_{T2}$) comprising message $X_3$ and message $X_1$ (i.e., the message for $UE_1$ that $UE_1$ was not able to decode). The NN may also inform $UE_1$ of $UE_2$'s decoding status (e.g., in this case NN informs $UE_1$ that $UE_2$ was able to decode $X_2$).

Step 5: in time slot t2 NN transmits $S_{r2}$. Also, as described above, depending on the UEs message decoding status, the NN adapts the transmission parameters, e.g., rate and/or power, of the UEs. For instance, the power used to transmit message $X_1$ in time slot t2 may be greater than the power that was used to transmit message $X_1$ in time slot 1 and/or the rate used to transmit message $X_3$ in time slot t2 may be greater than the rate used to transmit message $X_2$ in time slot t1 (i.e., message $X_3$ contains more information than message $X_2$).

Step 6: $UE_2$ receives signal $Y_2(t2)$ corresponding to $S_{r2}$ and $UE_2$ first tries to decode $X_1$ from signal $Y_2(t2)$ using the buffered residual signal(s). If $UE_2$ is successful in decoding $X_1$ from signal $Y_2(t2)$, then $UE_2$ can remove $X_1$ from signal $Y_2(t2)$, thereby allowing $UE_2$ to decode message $X_3$ from signal $Y_2(t2)$. That is, in each round, $UE_2$ tries to decode the message of $UE_1$ based on all interfering signals accumulated in different rounds. If $UE_2$ is not successful to decode the message of $UE_1$, it buffers the signals for possible uses in the next rounds. If it can decode the message of $UE_1$ correctly, it removes the message of $UE_1$ and decodes its own message interference-free.

The method above is described using Chase Combining HARQ, where the same signal is sent to $UE_1$ in different retransmission rounds; however, as described above, the same setup is well applicable for, e.g., incremental redundancy HARQ, where different redundancy signals are sent in different retransmission rounds. For every type of HARQ, $UE_2$ uses the standard decoding schemes to decode the message of $UE_1$ based on the signals accumulated in different rounds. Further, the above description assumes that the channel coefficients remain constant in different time slots; however the same approach is applicable in the cases with different values of channel coefficients in successive rounds.

B. The Adaptive Decoding Scheme for the Strong UE ($UE_1$)

Figure 4:
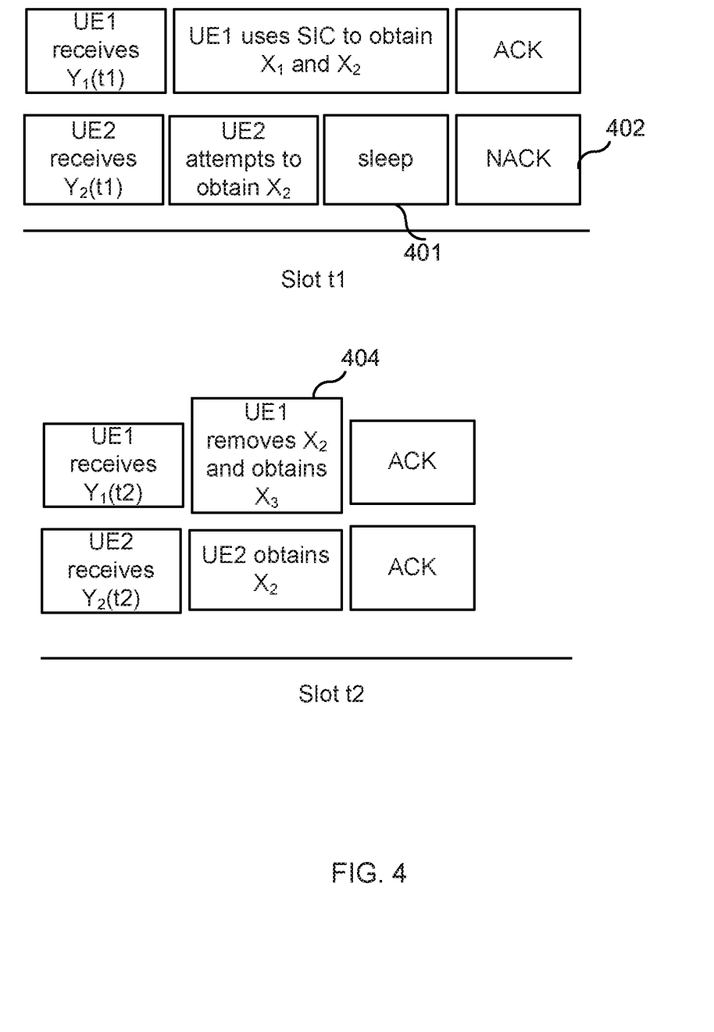
FIG. 4 illustrates processing, according to another embodiment, that occurs during first and second time slots.

In this embodiment, which is illustrated in FIG. 4, $UE_1$ utilizes the acknowledge/negative acknowledgement (ACK/NACK) signals of $UE_2$ to decide which receiver it will use. Consider two successive time slots, t1 and t2. Using the above example where the NN transmits $S_{r1}$ in time slot t1, there is reasonably high probability that the $UE_2$ cannot correctly decode from $S_{r1}$ message $X_2$ because message $X_1$, which is also contained in $S_{r1}$ appears as interference as well as because of the poor channel condition between $UE_2$ and the NN. Thus, NN may need to retransmit $X_2$ in timeslot t2.

$UE_1$, on the other hand, can use SIC to correctly decode from $S_{r1}$ both messages $X_1$ and $X_2$ with high probability, as $UE_1$ experiences high channel quality. Then, in slot t2, when the NN retransmits the same message for the $UE_2$ (i.e., $X_2$) by transmitting signal $S_{r2}$ containing a message for UE1 (denoted $X_3$) as well as X2, the $UE_1$ already has the decoded the message of the $UE_2$ (i.e., $X_2$). Thus, the $UE_1$ removes $X_2$ from $Y_1(t2)$, with no decoding process, and $UE_1$ decodes its own interference-free message ($X_3$) with conventional decoders.

In this way, the decoding complexity/delay and the error propagation probability is reduced, and the NOMA-based setup works in the same way as OMA-based systems. This process continues until the $UE_2$ correctly decodes its message or the maximum number of retransmission rounds is reached. The key to enable such adaptive decoding scheme at the $UE_1$ is to know about the message decoding status, i.e., ACK/NACK feedback signals, of the $UE_2$. In some embodiment, the NN provides the $UE_1$ with this information or $UE_1$ obtains it itself. Finally, because the decoding delay of SIC and conventional receivers are different, both UEs synchronize their signals based on the decoding scheme of the $UE_1$.

To summarize, in one embodiment, the following steps may be performed:

Step 1: The NN, using a NOMA transmission scheme, transmits in time slot t1 a first signal $S_{r1}$, which contains a message for $UE_1$ (denoted $X_1$) and a message for $UE_2$ (denoted $X_2$);

Step 2: $UE_1$ receives signal $Y_1(t1)$ corresponding to $S_{r1}$ (see equation (1)), $UE_2$ receives signal $Y_2(t1)$ corresponding to $S_{r1}$, $UE_1$ attempts to decode $X_1$ from $Y_1(t1)$, and $UE_2$ attempts to decode $X_2$ from $Y_2(t1)$. Assuming $UE_2$ was not able to decode $X_2$, $UE_2$ transmits a NACK (see block 402 in FIG. 4), which, in this example, causes NN to transmit in a following time slot (t2) a second signal $S_{r2}$ that contains $X_2$ and a message for $UE_1$ (denoted $X_3$, which may be identical to $X_1$ or a new message that is different than $X_1$).

Step 3: The NN receives the NACK transmitted by $UE_2$. The NN also receives the acknowledgement sent by $UE_1$.

Step 4: The NN informs $UE_1$ of $UE_2$'s decoding status, which informs $UE_1$ that in time slot t2 NN will transmit a signal ($S_{r2}$) comprising the message $X_3$ for $UE_1$ and message $X_2$ (i.e., the message for $UE_2$ that $UE_2$ was not able to decode). The NN may also inform $UE_2$ of $UE_1$'s decoding status. Assuming $UE_1$ transmits an ACK (positive acknowledgement), the NN will assume that in time slot t2 $UE_1$ will use a non-SIC decoder to decode message $X_3$ (e.g., NN will assume that in time slot t2 both $UE_1$ and $UE_2$ will use the same decoders or decoders that have the same timing) and the NN will inform $UE_2$ such that the signaling procedure of the UEs are synchronized. This can be performed by, e.g., NN sending to $UE_2$ information (e.g., an index) identifying a synchronization protocol (e.g., information indicating whether $UE_2$ need to employ a sleeping period 401 such that after $UE_2$ finishes its decoding process it waits for a certain amount of time before transmitting an acknowledgement).

Step 5: $UE_1$, after receiving the information about the message decoding status of the $UE_2$, selects an appropriate decoding scheme, i.e., SIC or conventional receiver, in the next time slot and adapts its synchronization protocol accordingly. Also, $UE_2$, depending on the selected decoding scheme of the $UE_1$, uses the received synchronization index to synchronize its transmit/receive timing.

Step 6: in time slot t2 NN transmits $S_{r2}$. Also, as described above, depending on the UEs message decoding status, the NN adapts the transmission parameters, e.g., rate and/or power, of the UEs. For instance, the power used to transmit message $X_2$ in time slot t2 may be greater than the power that was used to transmit message $X_2$ in time slot 1 and/or the rate used to transmit message $X_3$ in time slot t2 may be greater than the rate used to transmit message $X_1$ in time slot t1 (i.e., message $X_3$ contains more information than message $X_1$).

Step 7: $UE_1$ receives signal $Y_1(t2)$ corresponding to $S_{t2}$ and $UE_1$ uses the selected decoding scheme to decode $X_3$ from $Y_1(t2)$. For example, assuming that $UE_1$ was able to decode message $X_2$ from $Y_1(t1)$, then when $UE_1$ receives $Y_1(t2)$ in time slot t2, $UE_1$ can remove $X_2$ from $Y_1(t2)$ and then use a non-SIC receiver to decode message $X_3$ from the residual (see block 404 in FIG. 4).

The effectiveness of the proposed scheme depends on the channel coefficients remaining generally constant during the retransmission rounds, so that knowing $X_2$, the received interference term $h_1\sqrt{P_2}X_2$ can be removed by $UE_1$ from the received signal $Y_1(t2)$. As a result, the proposed scheme is most useful in stationary/slow-moving networks which, due to the high CSI acquisition and scheduling overhead of NOMA, are of most interest in NOMA-based systems.

The method above is described using Chase Combining HARQ, where the same signal is sent to $UE_2$ in different retransmission rounds; however, as described above, the same setup is well applicable for, e.g., incremental redundancy HARQ, where different redundancy signals are sent in different retransmission rounds. There, decoding the message of the $UE_2$, the $UE_1$ knows the redundancy signals sent for the $UE_2$ in next retransmissions and, as a result, can remove their corresponding received signals. Also, while the methods described above are described for the simplest case where, while the UE cannot correctly decode its message in round 1, the same procedure is applicable in any round of retransmission. The method described above use a scenario in which a strong UE is paired with a weak UE; this is motivated by the fact that the highest gain of NOMA is observed when two UEs with different channel qualities are paired. Nevertheless, the same setup is applicable for any pair of UEs.

Figure 5:
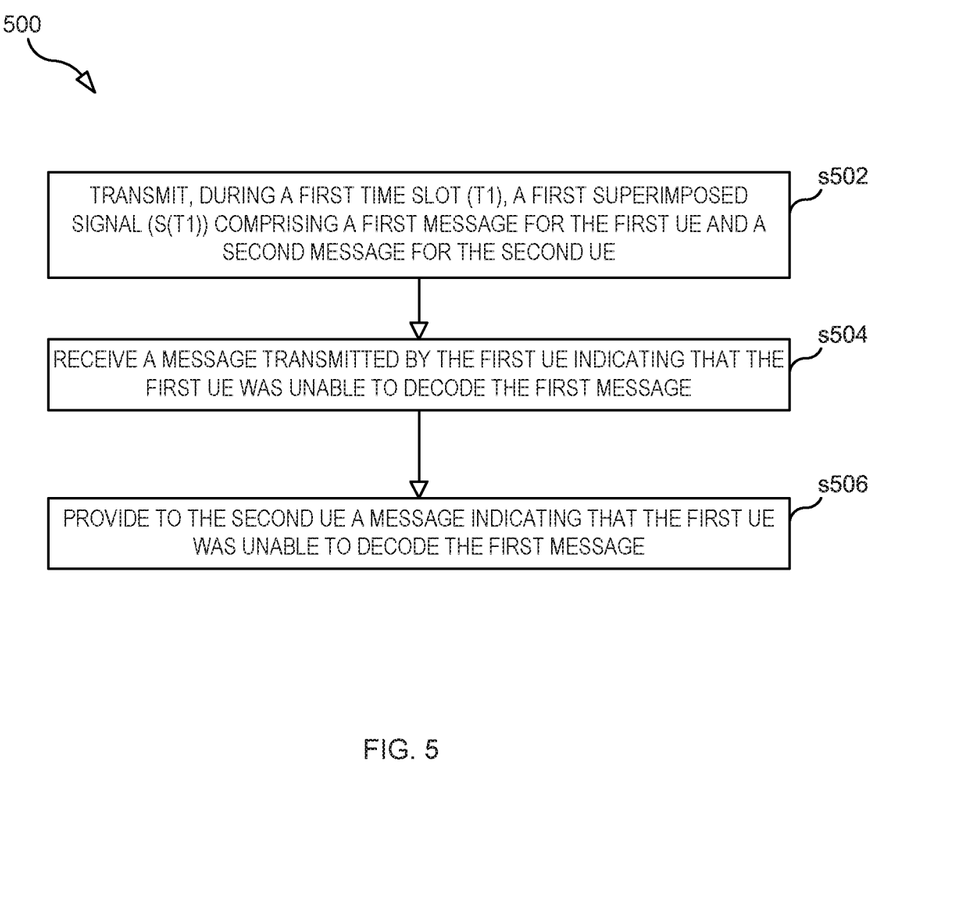
FIG. 5 is a flow chart illustrating a process according to one embodiment.

FIG. 5 is a flow chart illustrating a process 500, according to an embodiment, that is performed by the network node. Process 500 may begin in step s502 where the network node transmits, during a first time slot (t1), a first superimposed signal (S(t1)) comprising a first message for a first (e.g., UE 101 or UE 102) UE and a second message for a second UE (e.g., UE 101 or UE 102). In step s504, the network node receives a message transmitted by the first UE indicating that the first UE was unable to decode the first message. In step s506, after receiving the message transmitted by the first UE indicating that the first UE was unable to decode the first message, the network node provides to the second UE a message indicating that the first UE was unable to decode the first message.

In some embodiments, the process may further include, after receiving the message transmitted by the first UE indicating that the first UE was unable to decode the first message, the network node transmitting, during a second time slot (t2), a second superimposed signal (S(t2)) comprising the first message for the first UE and a third message for the second UE. Also, the process may further include the network node transmitting, during a third time slot, a third superimposed signal comprising a third message for the first UE and a fourth message for the second UE; the network node receiving a message transmitted by the second UE indicating that the second UE was unable to decode the fourth message for the second UE included in the third superimposed signal; and after receiving the message transmitted by the second UE indicating that the second UE was unable to decode the fourth message, the network node providing to the first UE a message indicating that the network node will retransmit in a fourth time slot at least a portion of the fourth message. The process may further include, after receiving the message transmitted by the second UE indicating that the second UE was unable to decode the fourth message, the network node transmitting, during the fourth time slot, a fourth superimposed signal comprising the fourth message for the second UE and a fifth message for the first UE.

Figure 6:
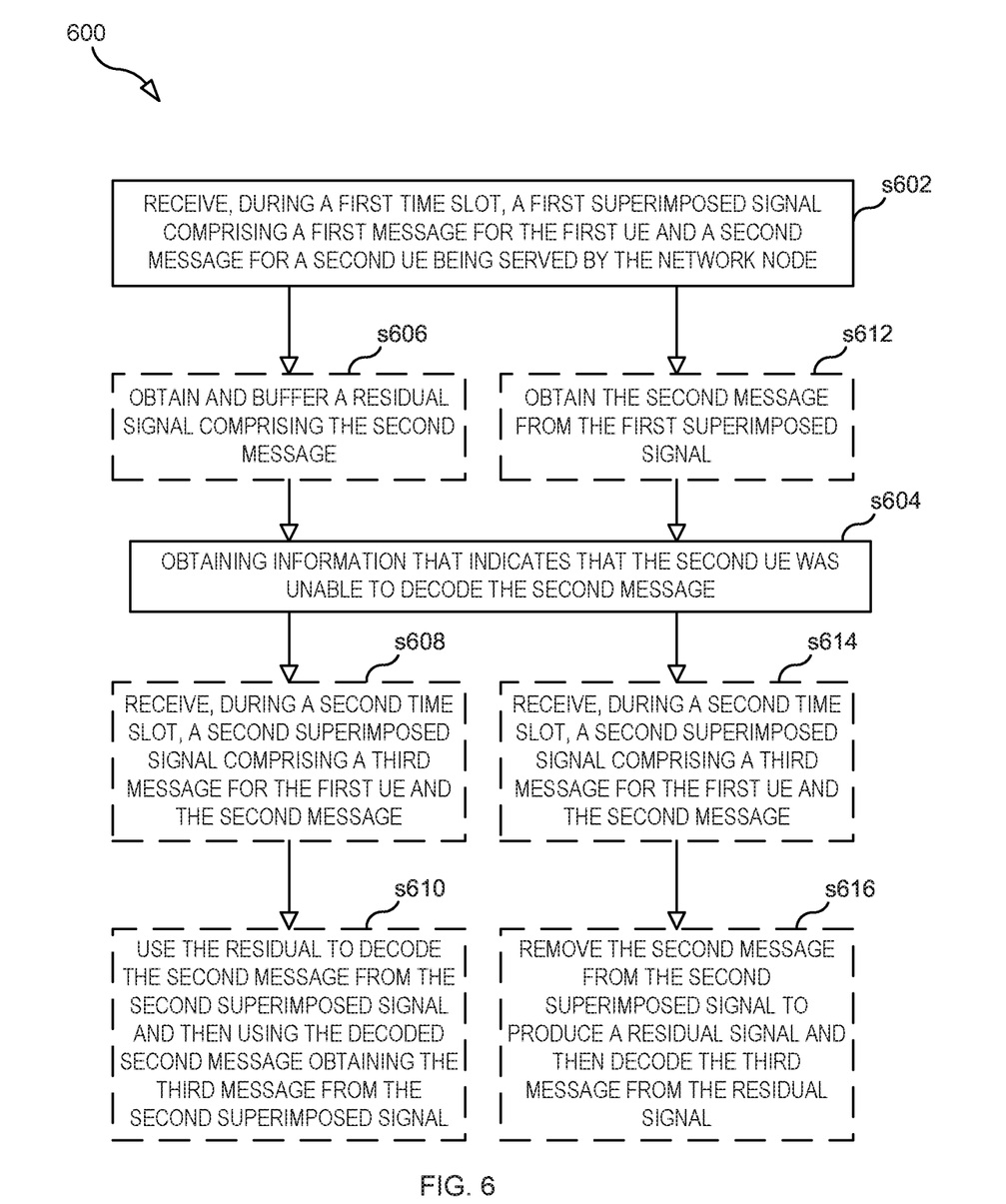
FIG. 6 is a flow chart illustrating a process according to one embodiment.

FIG. 6 is a flow chart illustrating a process 600 according to an embodiment. Process 600 may begin in step s602 where a first UE (e.g., UE 101 or UE 102) receives, during a first time slot, a first superimposed signal based on a superimposed signal transmitted by the network node, the first superimposed signal comprising a first message for the first UE and a second message for a second UE. In step s604, after receiving the first superimposed signal, the first UE obtains information that indicates that the second UE was unable to decode the second message and uses the obtained information to decode a third message for the first UE that is contained in a second superimposed signal received by the first UE. In some embodiments, the UE obtains the information by receiving a message transmitted by the network node, wherein the message indicates that the second UE was unable to decode the second message. In another embodiment, the first UE obtains the information comprises receiving a negative acknowledgement transmitted by the second UE.

In some embodiments, the first UE is a weak UE (e.g., $UE_2$) and further performs steps s606-s610. In step s606, the first UE: decodes the first message from the first superimposed signal, uses the obtained first message and the first superimposed signal to generate a residual signal comprising the second message for the second UE, and buffers the residual signal. In step s608 the first UE receives, during a second time slot, a second superimposed signal, the second superimposed signal comprising a third message for the first UE and at least a portion of the second message. In step s610, as a result of receiving the information indicating that the second UE was not able to decode the second message, the first UE: i) uses the buffered residual signal and the received second superimposed signal to obtain the second message (or portion thereof in case of incremental HARQ) and ii) uses the obtained second message (or portion thereof) and the received second superimposed signal to obtain the third message from the second superimposed signal.

In other embodiments, the first UE is a strong UE (e.g., $UE_1$) and further performs steps s612-s616. In step s612, the first UE obtains the second message from the first superimposed signal. In step s614, the first UE receives, during a second time slot, a second superimposed signal, the second superimposed signal comprising a third message for the first UE and at least a portion of the second message. In step s616, as a result of receiving the information indicating that the second UE was not able to decode the second message, the first UE removes the at least a portion of the second message from the second superimposed signal (e.g., removes $h_1\sqrt{P_1}X_2$ from the second superimposed signal) to produce a residual signal (e.g., $h_1\sqrt{P_1}X_3$) and then obtains the third message ($X_3$) from the residual signal using, for example, a conventional non-SIC decoder.

Figure 7:
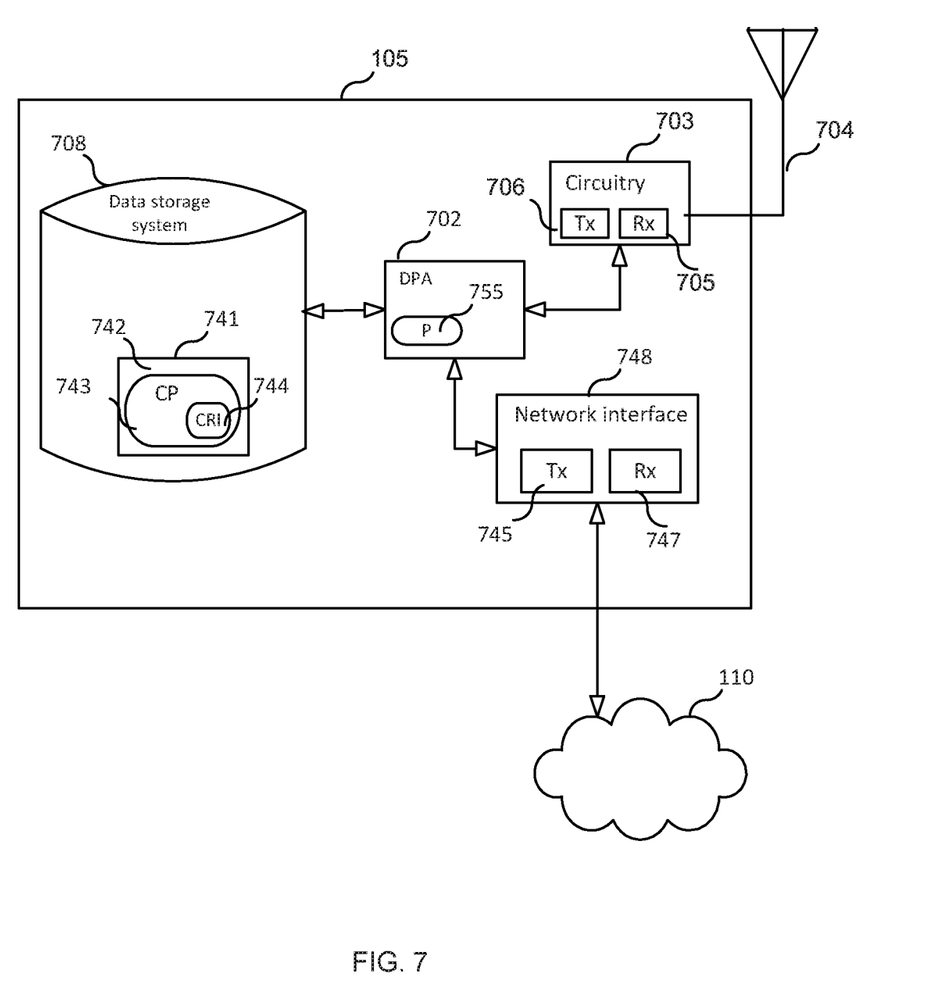
FIG. 7 is a block diagram of a network node according to one embodiment.

FIG. 7 is a block diagram of a network node 700, according to some embodiments for performing methods disclosed herein. As shown in FIG. 7, network node 700 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like); a network interface 748 comprising a transmitter (Tx) 745 and a receiver (Rx) 747 for enabling network node 700 to transmit data to and receive data from other nodes connected to a network 110 (e.g., an Internet Protocol (IP) network) to which network interface 748 is connected; circuitry 703 (e.g., radio transceiver circuitry comprising an Rx 705 and a Tx 706) coupled to an antenna system 704 for wireless communication with UEs); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes network node 700 to perform steps described herein (e.g., steps described herein with reference to the flow charts). In other embodiments, network node 700 may be configured to perform steps described herein without the need for code. That is, for example, PC 702 may consist merely of one or more ASICs. Hence, the features of the embodiments described herein may be implemented in hardware and/or software.

Figure 8:
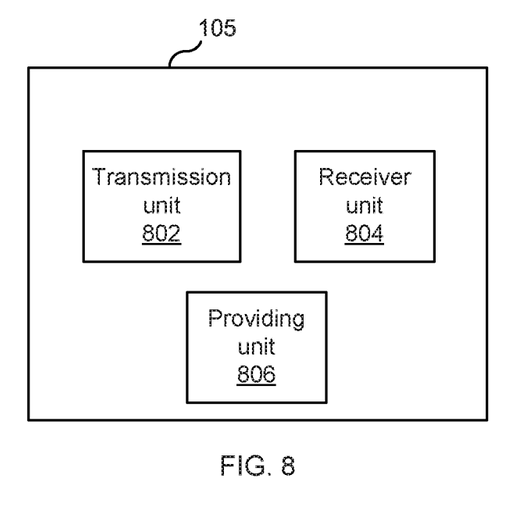
FIG. 8 is a diagram showing functional units of a network node according to one embodiment.

FIG. 8 is a diagram showing functional units of network node 105 according to one embodiment. In the embodiment shown, network node 105 includes: a transmission unit 802 for employing a transmitter to transmit a first superimposed signal; a receiver unit 804 for employing a receiver to obtain a message transmitted by the first UE (e.g., UE 101 or UE 102) indicating that the first UE was unable to decode the first message; and a providing unit 806 for providing to the second UE a message indicating that the first UE was unable to decode the first message.

Figure 9:
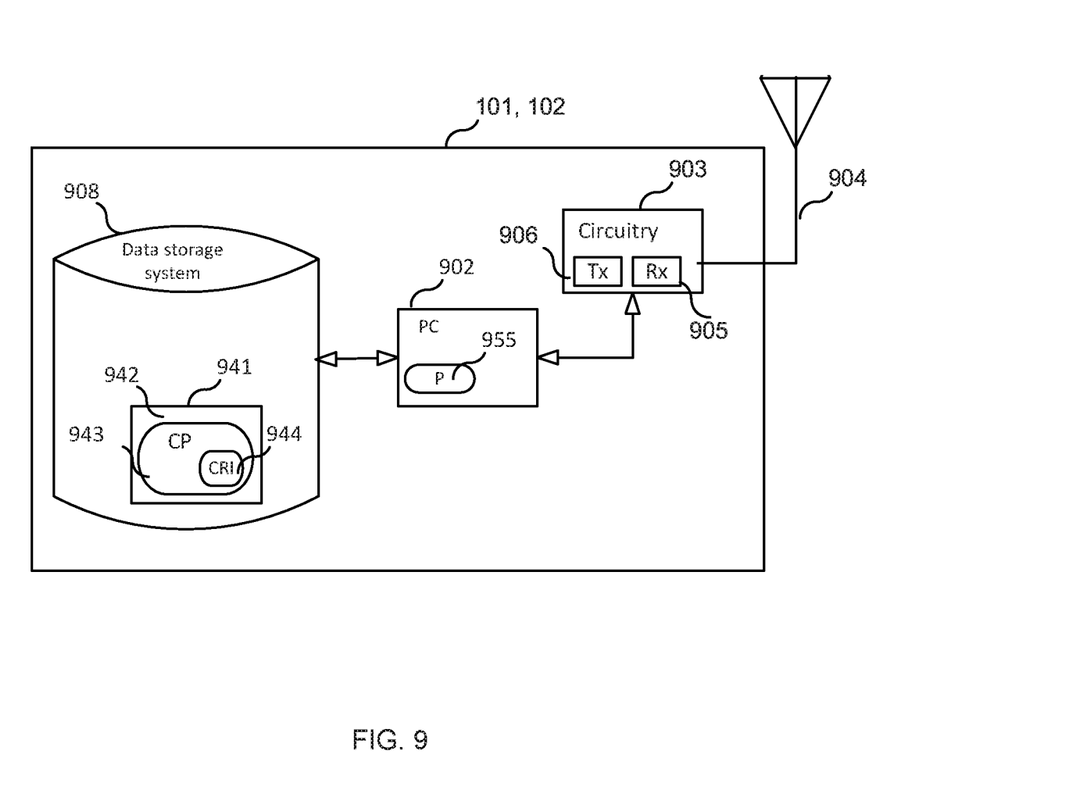
FIG. 9 is a block diagram of a UE according to one embodiment.

FIG. 9 is a block diagram of a UE (e.g. UE 101 or UE 102), according to some embodiments. As shown in FIG. 9, the UE may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like); circuitry 903 (e.g., radio transceiver circuitry comprising an Rx 905 and a Tx 906) coupled to an antenna system 904 for wireless communication); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes the UE to perform steps described herein (e.g., steps described herein with reference to the flow charts). In other embodiments, the UE may be configured to perform steps described herein without the need for code. That is, for example, PC 902 may consist merely of one or more ASICs. Hence, the features of the embodiments described herein may be implemented in hardware and/or software.

Figure 10:
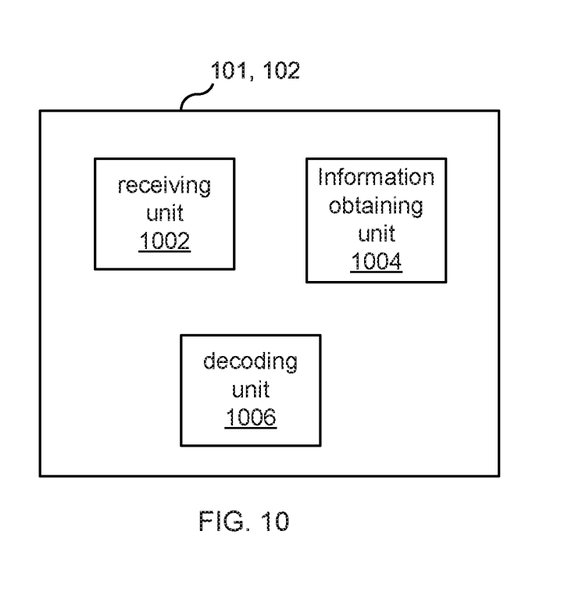
FIG. 10 is a diagram showing functional units of a UE according to one embodiment.

FIG. 10 is a diagram showing functional units of a UE (e.g., UE 101 or UE 102) according to one embodiment. In the embodiment shown, the UE includes: a receiving unit 1002 for employing a receiver to obtain a first superimposed signal based on a superimposed signal transmitted by the network node, an information obtaining unit 1004 for obtaining information indicating that the second UE was unable to decode the second message from the first superimposed signal, and a decoding unit 1006 for using the obtained information to decode a third message for the first UE that is contained in a second superimposed signal received by the first UE.

Figure 11:
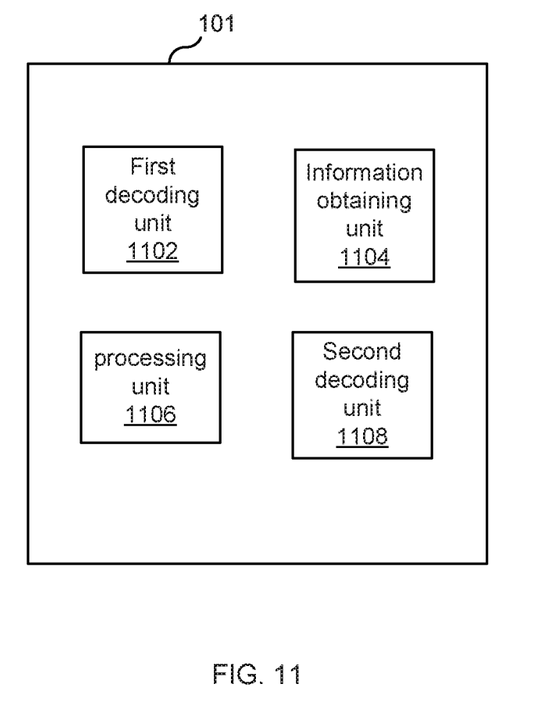
FIG. 11 is a diagram showing functional units of a UE according to one embodiment.

FIG. 11 is a diagram showing functional units of UE 101 according to one embodiment. In the embodiment shown, UE 101 includes a first decoding unit 1102 for obtaining first and second messages from a first superimposed signal, wherein the first message is for the first UE and the second message is for a second UE (e.g., UE 102). UE 101 further includes an information obtaining unit 1104 for obtaining information that indicates that the second UE was unable to decode the second message from the first superimposed signal. UE 101 further includes a processing unit 1106 configured such that, as a result of the obtaining unit obtaining information that indicates that the second UE was unable to decode the second message from the first superimposed signal, the processing unit 1106 employs a second decoding unit 1108 to obtain a third message from a second superimposed signal comprising the third message and at least a portion of the second message. The second decoding unit 1108 is different than the first decoding unit 1102. The second decoding unit 1108 is configured to use the second message obtained via the first decoding unit 1102 to remove the at least a portion of the second message from the second superimposed signal, thereby producing a residual signal. And the second decoding unit 1108 is configured to obtain the third message from the residual signal.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first user equipment, UE, that is being served by a network node, the method comprising:
   the first UE receiving a first superimposed signal, the first superimposed signal comprising a first message for the first UE and a second message for a second UE being served by the network node;
   the first UE obtaining the first message from the first superimposed signal;

the first UE obtaining the second message from the first superimposed signal;

after receiving the first superimposed signal, the first UE obtains information that indicates that the second UE was unable to decode the second message from the first superimposed signal;

after receiving the first superimposed signal, the first UE receiving a second superimposed signal comprising at least a portion of the second message for the second UE and a third message for the first UE; and as a result of receiving the information indicating that the second UE was unable to decode the second message from the first superimposed signal, the first UE uses the obtained second message to remove the at least a portion of the second message from the second superimposed signal, thereby producing a residual signal, and obtains the third message from the residual signal.

2. The method of claim 1, wherein obtaining the information comprises receiving a message transmitted by the network node, wherein the message indicates that the second UE was unable to decode the second message.

3. The method of claim 1, wherein obtaining the information comprises receiving a negative acknowledgement transmitted by the second UE.

4. The method of claim 1, wherein the first UE employs successive interference cancellation (SIC) to obtain the first and second messages from the first superimposed signal.

5. The method of claim 4, the first UE employs a non-SIC decoder to obtain the third message from the residual signal.

6. The method of claim 1, wherein the first UE is experiencing a better channel condition than the second UE.

7. The method of claim 1, wherein
the second superimposed signal comprises the second message, and
the first UE uses the obtained second message to remove the second message from the second superimposed signal.

8. The method of claim 1, wherein
the first UE takes a first amount of time to obtain the first and second messages from the first superimposed signal,
the first UE takes a second amount of time to produce the residual signal and obtain the third message from the residual signal, and
the first amount of time is greater than the second amount of time.

9. A computer program product comprising a non-transitory computer readable medium storing a computer program comprising instructions which, when executed by processing circuitry, causes the processing circuitry to carry out the method of claim 1.

10. A first user equipment, the first user equipment, UE, being operable to:
receive a first superimposed signal, the first superimposed signal comprising a first message for the first UE and a second message for a second UE being served by the network node;
obtain the first message from the first superimposed signal;
obtain the second message from the first superimposed signal;

after receiving the first superimposed signal, obtain information that indicates that the second UE was unable to decode the second message from the first superimposed signal;

after receiving the first superimposed signal, receive a second superimposed signal comprising at least a portion of the second message for the second UE and a third message for the first UE; and as a result of receiving the information indicating that the second UE was unable to decode the second message from the first superimposed signal, use the obtained second message to remove the at least a portion of the second message from the second superimposed signal, thereby producing a residual signal, and obtain the third message from the residual signal.

11. The first UE of claim 10, wherein obtaining the information comprises receiving a message transmitted by the network node, wherein the message indicates that the second UE was unable to decode the second message.

12. The first UE of claim 10, wherein obtaining the information comprises receiving a negative acknowledgement transmitted by the second UE.

13. The first UE of claim 10, wherein the first UE is configured to employ successive interference cancellation (SIC) to obtain the first and second messages from the first superimposed signal.

14. The first UE of claim 13, the first UE is configured to employ a non-SIC decoder to obtain the third message from the residual signal.

15. The first UE of claim 10, wherein
the second superimposed signal comprises the second message, and
the first UE is configured to use the obtained second message to remove the second message from the second superimposed signal.

16. A first user equipment, the first user equipment, UE,
a first decoding unit for obtaining first and second messages from a first superimposed signal, wherein the first message is for the first UE and the second message is for a second UE;
an information obtaining unit for obtaining information that indicates that the second UE was unable to decode the second message from the first superimposed signal; and
a processing unit configured such that, as a result of the obtaining unit obtaining information that indicates that the second UE was unable to decode the second message from the first superimposed signal, the processing unit employs a second decoding unit to obtain a third message from a second superimposed signal comprising the third message and at least a portion of the second message, wherein
the second decoding unit is different than the first decoding unit,
the second decoding unit is configured to use the second message obtained via the first decoding unit to remove the at least a portion of the second message from the second superimposed signal, thereby producing a residual signal, and
the second decoding unit is configured to obtain the third message from the residual signal.

* * * * *